(12) United States Patent
Stanton (10) Patent No.: US 7,599,008 B2
(45) Date of Patent: Oct. 6, 2009

(54) METHOD AND/OR APPARATUS FOR CROSS-COLOR AND CROSS-LUMINANCE SUPPRESSION USING SHIMMER DETECTION

(75) Inventor: Mark E. Stanton, Palo Alto, CA (US)

(73) Assignee: LSI Corporation, Milpitas, CA (US)

( * ) Notice: Subject to any disclaimer, the term of this patent is extended or adjusted under 35 U.S.C. 154(b) by 826 days.

(21) Appl. No.: 11/318,231

(22) Filed: Dec. 23, 2005

(65) Prior Publication Data

US 2007/0121013 A1    May 31, 2007

Related U.S. Application Data

(60) Provisional application No. 60/740,860, filed on Nov. 30, 2005.

(51) Int. Cl.
*H04N 11/14* (2006.01)
(52) U.S. Cl. ..................... 348/609
(58) Field of Classification Search ............ None
See application file for complete search history.

(56) References Cited

U.S. PATENT DOCUMENTS

| | | | | |
|---|---|---|---|---|
| 4,731,660 A | * | 3/1988 | Faroudja et al. | 348/610 |
| 5,483,294 A | * | 1/1996 | Kays | 348/609 |
| 7,324,163 B2 | * | 1/2008 | Bacche | 348/663 |
| 2006/0007354 A1 | * | 1/2006 | Chao | 348/450 |
| 2007/0109448 A1 | * | 5/2007 | Winger et al. | 348/624 |

OTHER PUBLICATIONS

FLT_TemporalComb.asm,v 1.9 Aug. 7, 2002 by Lindsey Dubb. Source Code, Object Code and related notes; 15 pages—Copyright 2001, 2002 Lindsey Dubb.
FLT_TemporalComb.c,v 1.13 Aug. 7, 2002 00:41:59 lindsey Exp by Lindsey Dubb. Source Code, Object Code and related notes; 13 pages—Copyright 2001, 2002 Lindsey Dubb.

\* cited by examiner

*Primary Examiner*—Paulos M Natnael
(74) *Attorney, Agent, or Firm*—Christopher P. Maiorana, PC (57) ABSTRACT

An apparatus comprising one or more delay circuits, a shimmer detector circuit, an averaging circuit, and a multiplexer. The delay circuits may be configured to have a delay of one or more frame periods based on the format of the input video signal. The shimmer detector circuit may be configured to (i) determine which pixel locations in the input video signal exhibit the YC-interference noise oscillation pattern based on the input signal and the output of the delay circuits and (ii) generate a control signal in response to the output of the delays circuits and the input signal. The averaging circuit may be configured to calculate an average of the input signal and the output of the first delay circuit. The multiplexer may be configured to present (i) the input signal when the control signal is in a first state and (ii) the average signal when the control signal is in a second state.

20 Claims, 6 Drawing Sheets

FIG. 1

$y_{id}, cr_{id}, cb_{id}$ — IDEAL VALUE OF PIXEL LOCATION
$y_c, cr_y, cb_y$ — YC- INTERFERENCE NOISE

For NTSC, $T_{cp} = T - 2$. For PAL, $T_{cp} = T - 4$.

FIG. 5

For NTSC, $T_{op} = T - 2$ and $T_{ip} = T - 4$. For PAL, $T_{op} = T - 4$ and $T_{ip} = T - 8$.

METHOD AND/OR APPARATUS FOR CROSS-COLOR AND CROSS-LUMINANCE SUPPRESSION USING SHIMMER DETECTION

This application claims the benefit of U.S. Provisional Application No. 60/740,860, filed Nov. 30, 2005 and is hereby incorporated by reference in its entirety.

FIELD OF THE INVENTION

The present invention relates to video processing generally and, more particularly, to a method and/or apparatus for cross-color and cross-luminance suppression using shimmer detection.

BACKGROUND OF THE INVENTION

In composite video signals, the luminance and chrominance signals are transmitted in the same bandwidth. The chrominance signal is modulated onto a sub-carrier signal and then added to a luminance signal to create a baseband signal. The baseband signal is then modulated onto a carrier for transmission. At the decoder, the baseband signal must be processed to separate the chrominance and luminance signals. Some mixing of the two signals is unavoidable, resulting in YC-interference noise, also called cross-color and cross-luminance. Cross-color is the result of decoding part of the luminance signal as color data. The changes in the sub-carrier phase cause the YC-interference noise to affect the decoded digital signal in a predictable way. For still pixels (pixels whose ideal, noise-free component values are not changing between frames), the value of the YC-interference noise in the decoded cross-luminance is the result of decoding part of the color signal as luminance data.

Figure 1:
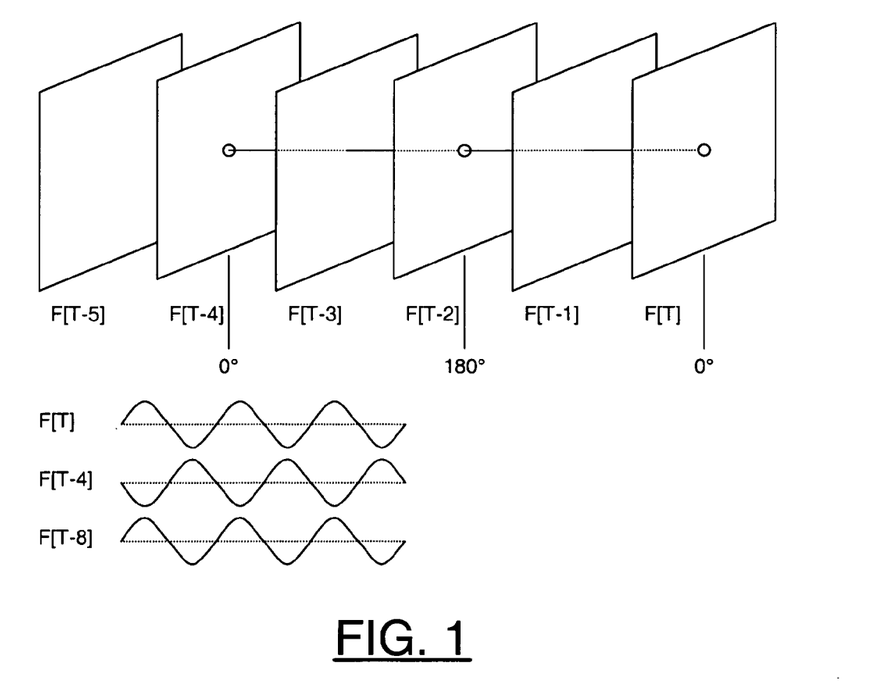
FIG. 1 is a diagram illustrating the pattern of change in the color sub-carrier phase for NTSC video.
Figure 2:
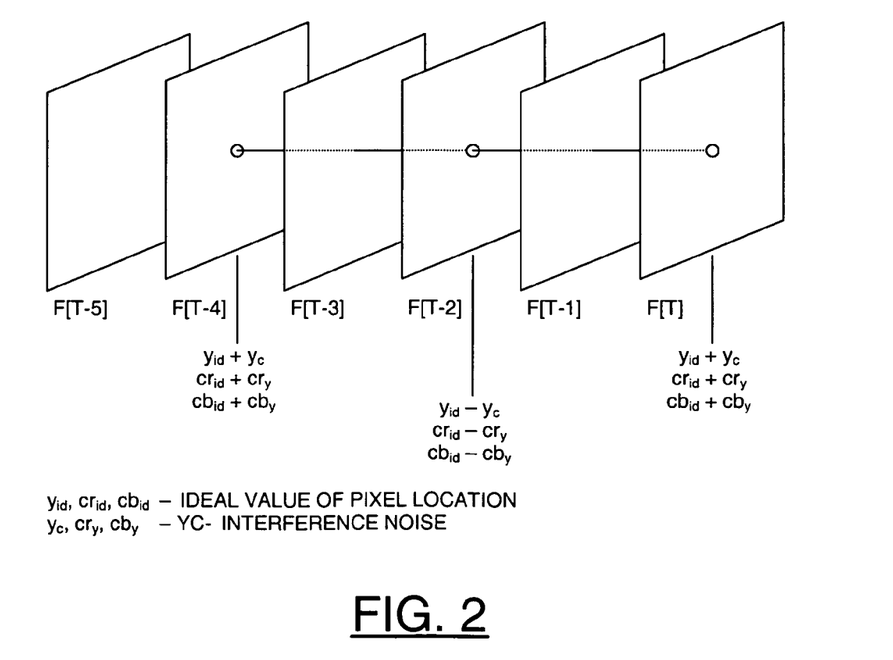
FIG. 2 is a diagram illustrating the oscillation pattern in the component values of still pixel locations caused by YC-interference noise as a result of the color-subcarrier phase pattern in NTSC video.

For both National Television System Committee (NTSC) and phase alternating line (PAL) transmission standards, the phase of the color sub-carrier changes with each frame in a specified pattern. For NTSC, the phase of the color sub-carrier inverts every frame. As a result, in unchanging "still" pixel locations, YC-interference noise causes the components of the pixel location to oscillate about an ideal value at the frame rate. Such an oscillating effect which is often referred to as shimmering is illustrated by the following equations:

$$y_{F\_in[T]} = y_{id} + y_c, y_{F\_in[T-2]} = y_{id} - y_c, y_{F\_in[T-4]} = y_{id} + y_c$$

$$cr_{F\_in[T]} = cr_{id} + cr_y, cr_{F\_in[T-2]} = cr_{id} - cr_y, cr_{F\_in[T-4]} = cr_{id} + cr_y$$

$$cb_{F\_in[T]} = cb_{id} + cb_y, cb_{F\_in[T-2]} = cb_{id} - cb_y, cb_{F\_in[T-4]} = cb_{id} + cb_y$$

where
- $Y_{id}$, $cr_{id}$, $cb_{id}$—Ideal value of components of the pixel location
- $Y_c$, $cr_y$, $cb_y$—Absolute value of YC-interference noise
- F_in[t]—The Sequence of input video fields
- T—The index of the most recent input field The ideal value of still pixel locations can be recovered by averaging the pixel values in adjacent fields. FIGS. 1 and 2 illustrate the pattern of the color sub-carrier phase change in NTSC video and the resulting pattern in the YC-interference noise at still pixel locations.

For PAL, the phase of the color sub-carrier shifts by 90° every frame so that the sub-carrier inverts every 2 frames. YC-interference noise at unchanging pixel locations causes the actual value of the pixel to oscillate around the ideal value at half the frame rate, as shown by the following equations:

$$y_{F\_in[T]} = y_{id} + y_c, y_{F\_in[T-4]} = y_{id} - y_c, y_{F\_in[T-8]} = y_{id} + y_c$$

$$cr_{F\_in[T]} = cr_{id} + cr_y, cr_{F\_in[T-4]} = cr_{id} - cr_y, cr_{F\_in[T-8]} = cr_{id} + cr_y$$

$$cb_{F\_in[T]} = cb_{id} + cb_y, cb_{F\_in[T-4]} = cb_{id} - cb_y, cb_{F\_in[T-8]} = cb_{id} + cb_y$$

Figure 3:
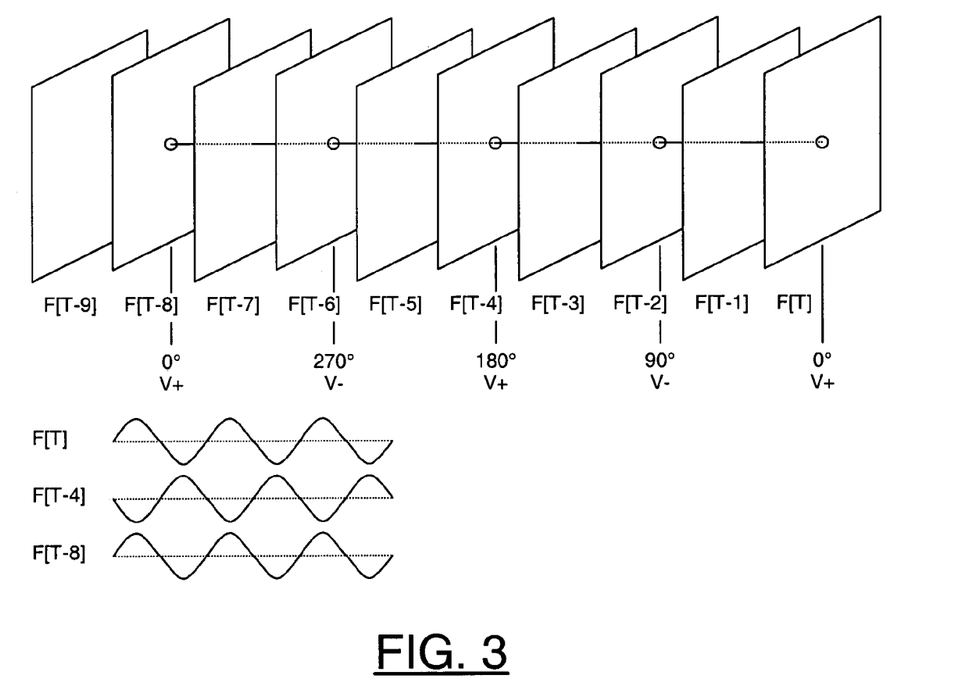
FIG. 3 is a diagram illustrating the pattern of change in the color sub-carrier phase for PAL video.
Figure 4:
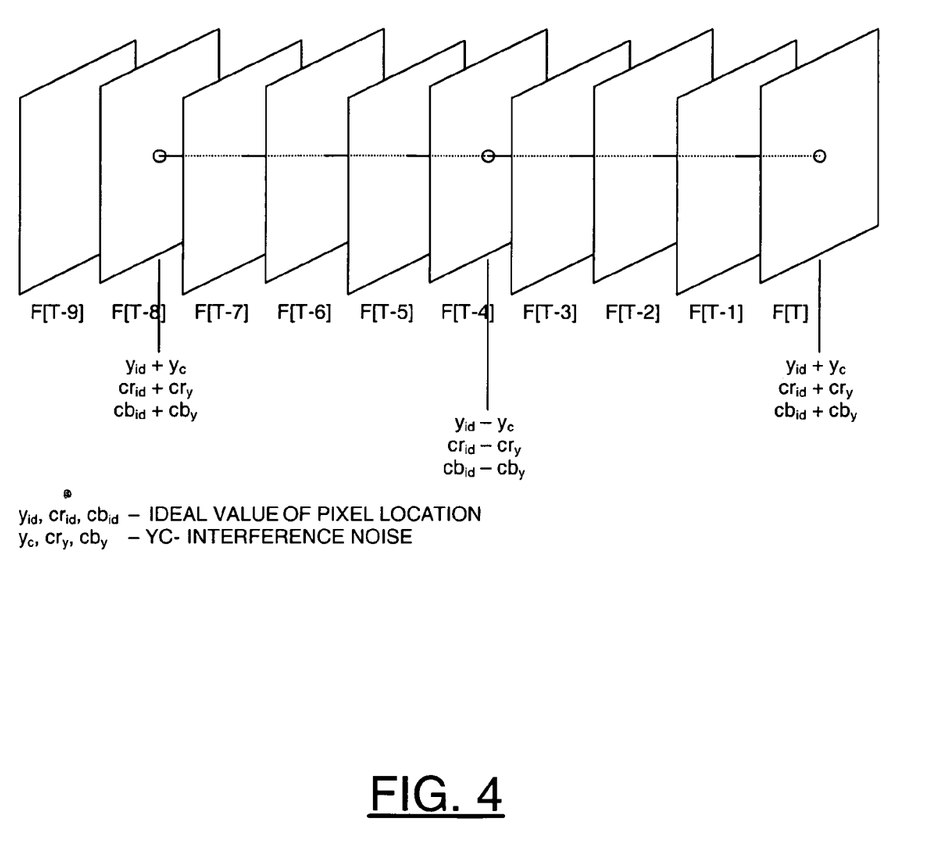
FIG. 4 is a diagram illustrating the oscillation pattern in the component values at still pixel locations caused by, YC-interference noise as a result of the color-subcarrier phase pattern in PAL video.

The ideal value of still pixel locations can be recovered by averaging the pixel values in fields T and T−4. FIGS. 3 and 4 illustrate the pattern of the color sub-carrier phase changes in PAL video and the resulting pattern in the YC-interference noise at still pixel locations.

Figure 5:
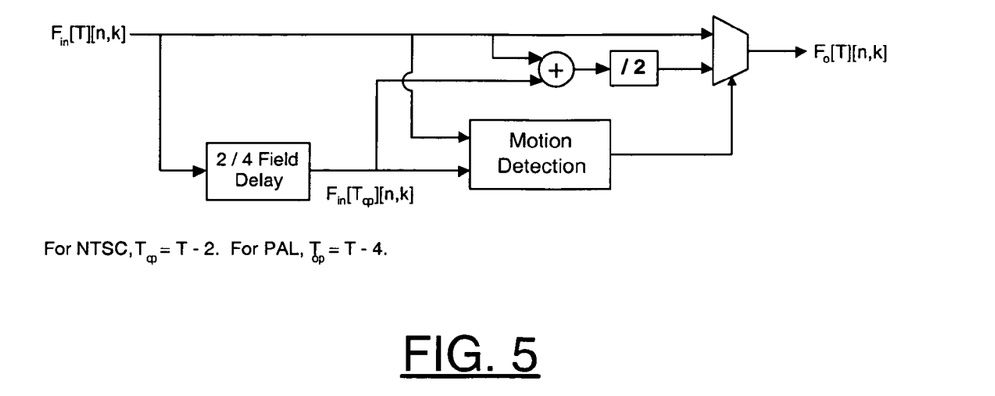
FIG. 5 is a diagram illustrating a conventional temporal comb filter using a motion detector.

The effect of the changing phase of the color sub-carrier on the YC-interference noise makes it possible to use temporal filtering to eliminate the cross-luminance and cross-color in the separated luminance and chrominance signals. Because non-adaptive temporal filtering causes visual artifacts in moving areas of the video, some method of adapting the filter to prevent those artifacts is needed. One conventional approach uses a motion detector to switch the filter off in areas of the video that have motion. Such a conventional approach is shown in FIG. 5. The problem with such an approach is that the YC-interference noise that the filter is trying to eliminate can cause motion detectors to incorrectly label still areas as motion areas.

It would be desirable to implement a detector that identifies and filters particular pixels whose components exhibit the oscillation pattern caused by YC-interference noise.

SUMMARY OF THE INVENTION

The present invention concerns an apparatus comprising one or more delay circuits, a shimmer detector circuit, an averaging circuit, and a multiplexer. The one or more delay circuits may be configured to generate a delay of one or more frame periods in response to the format of an input signal. The shimmer detector circuit may be configured to (i) determine which pixel locations in the input signal exhibit an oscillation pattern in their component values and (ii) generate a control signal in response to the outputs of the delay circuits and the input signal. The averaging circuit may be configured to calculate an average signal in response to the input signal and the output of the first delay circuit. The multiplexer may be configured to present (i) the input signal and (ii) the average signal in response to the control signal from the shimmer detector circuit.

The objects, features, and advantages of the present invention include providing a method and/or apparatus of removing YC-interference noise from post-separation video signals that (i) does not reduce the vertical or horizontal resolution of the video, (ii) filters only those pixel locations affected by noise without causing artifacts in the presence of motion and/or (iii) is effective in the presence of strong YC-interference noise.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMRNTS

Figure 6:
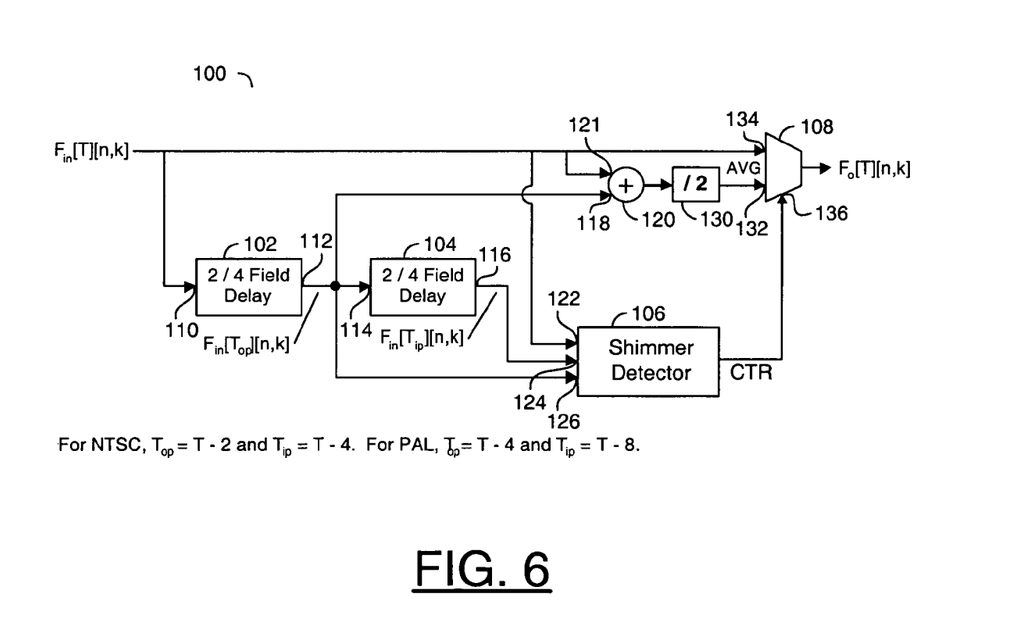
FIG. 6 is a diagram illustrating a preferred embodiment of the present invention.

Referring to FIG. 6, a block diagram of a circuit 100 is shown in accordance with a preferred embodiment of the present invention. The circuit 100 generally comprises a block (or circuit) 102, a block (or circuit) 104, a block (or circuit) 106 and a block (or circuit) 108. The circuit 102 may be implemented as a delay circuit. In one example, the circuit 102 may be implemented as a 2/4 field delay circuit. Similarly, the circuit 104 may be implemented as a delay circuit. In one example, the circuit 104 may be implemented as a 2/4 field delay circuit. The circuit 106 may be implemented as a detector circuit. In one example, the circuit 106 may be implemented as a shimmer detector circuit. The circuit 108 may be implemented as a multiplexer circuit. The circuit 102 may have an input 110 that receives an input signal. The circuit 102 may have an output 112 that presents a signal to an input 114 of the circuit 104. The circuit 104 may have an output 116. The output 112 may also be presented to an input 118 of an adder circuit 120. The adder circuit 120 may also have an input 121 that may receive the input signal. The input signal may also be presented to an input 122 of the shimmer detector 106. The shimmer detector 106 may also have an input 124 that may receive the input signal and an input 126 that may receive a signal from the circuit 102. The adder 120 may present an output to a circuit 130. The circuit 130 may be a divide-by-two circuit. The circuit 130 may present a signal (e.g., AVG) to the input 132 of the multiplexer. The multiplexer 108 may also have an input 134 that receives the input signal. The shimmer detector 106 may present a signal (e.g., CTR) to a control input 136 of the multiplexer 108. An averaging circuit generally comprises the adder circuit 118 and the divide-by-two circuit 130. The delay circuit 104 and the delay circuit 106 may delay one or more frame periods based on the format (e.g., NTSC or PAL) of the input signal. The delay circuit 102 may present a first delay of one or more frame periods to the adder circuit 120 and the shimmer detector circuit 120. The delay circuit 104 may present a second delay of one or more frame periods to the shimmer detector 106. Each component (y, cr and cb) is averaged separately. The averaging circuit may provide a filtered signal (e.g., AVG) that is free of YC-interference noise in still pixel locations. The ideal values of a still pixel location's components may be recovered in the presence of YC-interference noise by averaging the components' current values with the components' values from 2 or 4 fields previous.

The circuit 100 may use the shimmer detector circuit 106 to identify the pixel locations in the input video frame on the input video signal whose components which exhibit the oscillation pattern caused by YC-interference noise at still pixel locations. The circuit 100 allows filtering of only the affected pixels. Since the oscillation pattern only occurs in pixels having ideal values that are unchanging (e.g., pixels in still areas), the circuit 100 avoids creating motion artifacts.

The shimmer detector 106 generally looks for pixel component values that oscillate with a constant amplitude around a fixed value at half (e.g., for NTSC) or one-quarter (e.g., for PAL) the frame rate as a result of YC-interference. To detect such oscillation, it may be necessary to examine the component values of a particular pixel over a period of time. Because random noise and motion in the video can cause the component values of the pixel to mimic the YC-interference oscillation pattern over short intervals, this period of time is greater than the time which may be stored in the delay circuit 102 and the delay circuit 104. To overcome this problem, the shimmer detector 106 may implement a two-tier "shimmer test". The first tier is a "short-term" test that examines each locations' component values over a short period of time to make a tentative identification of those still locations that are "shimmering" (e.g., oscillating as a result of YC-interference noise). The second tier uses a "shimmer value" for each pixel location to track the results of the short-term test over a longer period of time in order to make a final determination of the shimmer status of each location. The delay circuit 102 and the delay circuit 104 provide a short-term history of the component values for each pixel location that may be used by the shimmer detector 106 for the short-term test. The shimmer detector 106 may provide the results of the two-tier shimmer test on the signal CTR. The signal CTR may change at the pixel frequency in response to the results of the shimmer test for each pixel location in every frame. If the shimmer detector 106 determines that a pixel location is shimmering for the current input frame, the signal CTR will select the signal AVG as the output of the multiplexer 108. If the shimmer detector 106 determines that a pixel location is not shimmering, the signal CTR will select the input signal as the output of the multiplexer 108. The delays of the paths from the input 100 to the inputs 132, 134, and 136 on the multiplexer 108 should be equal in order to synchronize the CTR signal with the correct signals on 132 and 134.

Figure 7:
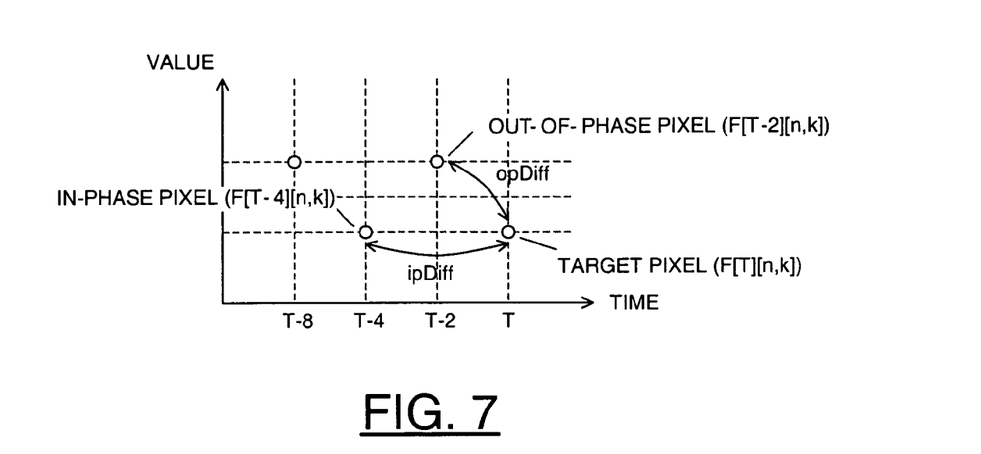
FIG. 7 is a diagram illustrating a component value of a shimmering pixel location (NTSC)
Figure 8:
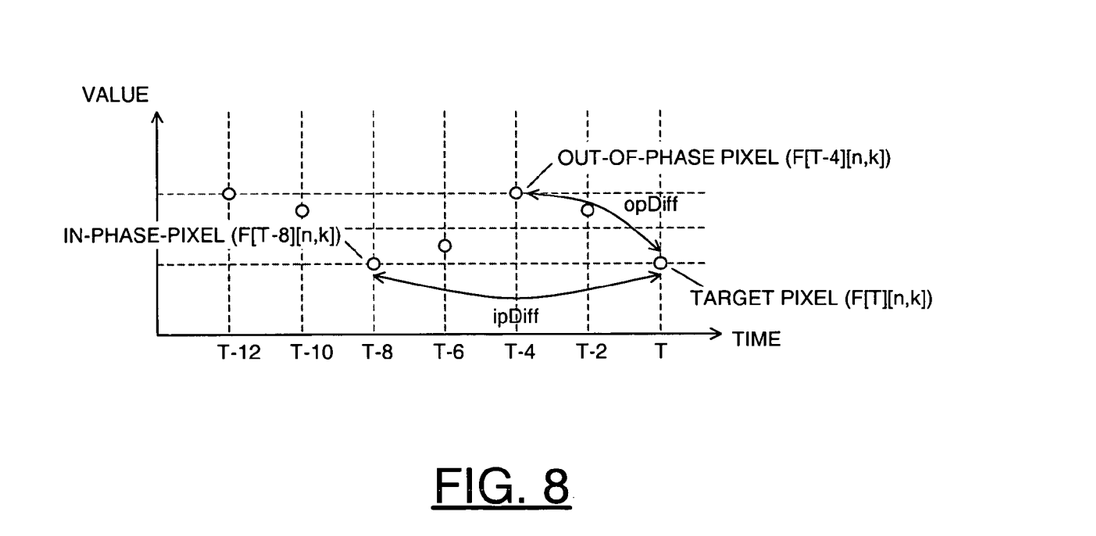
FIG. 8 is a diagram illustrating a component value of a shimmering pixel location (PAL)

FIGS. 7 and 8 illustrate the value over time of a component of a still and shimmering pixel location in an NTSC signal and a PAL signal, respectively. A "target pixel" refers to the component values of a pixel location in the current input field (e.g., the target field). An "out-of-phase pixel" refers to the components values of a pixel location in the most recent input field that is the same polarity (even or odd) as the target field and has a color sub-carrier phase that is 180° out-of-phase with the sub-carrier phase of the target field (e.g., the out-of-phase field). An "in-phase pixel" refers to the components values of a pixel location in the most recent input field that is the same polarity as the target field and has a color sub-carrier phase that is in-phase with the sub-carrier phase of the target field (e.g., the in-phase field). In the ideal (e.g., no random noise) case, if the pixel location is still and shimmering, then the component values of the pixel will be shown in TABLE 1 with at least one of $y_c$, $cr_y$, or $cb_y$ being greater than zero:

TABLE 1

| Target | Out-of-Phase | In-Phase |
|---|---|---|
| $y_{id} + y_c$ | $y_{id} - y_c$ | $y_{id} + y_c$ |
| $cr_{id} + cr_y$ | $cr_{id} - cr_y$ | $cr_{id} + cr_y$ |
| $cb_{id} + cb_y$ | $cb_{id} - cb_y$ | $cb_{id} + cb_y$ |

The absolute differences between the component values of the target pixel and the component values of the in-phase pixels (e.g., the in-phase differences) will be zero. In a non-ideal case, noise and other imperfections in the system may invariably cause the in-phase differences to be greater than zero.

For the short-term shimmer test, the shimmer detector 106 may compare the target pixel, the out-of-phase pixel, and the in-phase pixel for the pixel location. A pixel location may be considered to exhibit a "shimmer pattern" for the target field if (i) the target pixel and the in-phase pixel match (e.g., the component values are close) and (ii) the difference between the target pixel and the out-of-phase pixel is greater than the difference between the target pixel and the in-phase pixel. More precisely, the pixel location [n,k] exhibits a shimmer pattern for the target field F_in[T] if $$(i)(ip\text{Diff}Y <= Y\text{Match}Th) \text{ and } (ip\text{Diff}Cr <= Cr\text{Match}Th) \quad \text{EQ1}$$

and $$(ip\text{Diff}Cb <= Cb\text{Match}Th); \text{ and}$$

$$(ii)(op\text{Diff}Y > ip\text{Diff}Y) \text{ or } (op\text{Diff}Cr > ip\text{Diff}Cr) \text{ or}$$

$$(op\text{Diff}Cb > ip\text{Diff}Cb) \quad \text{EQ 2}$$

where [n,k] represent the horizontal and vertical indices of the pixel location in a video frame. Even fields includes locations with even ks. Odd fields include locations with odd ks. As a result, only half of the locations in the frame may be tested during each input field period. The variables ipDiffY, ipDiffCr, and ipDiffCb may be defined as the in-phase differences for the components y, cr and cb of the pixel location respectively. The variables opDiffY, opDiffCr, and opDiffCb may be defined as the out-of-phase differences for the components y, cr and cb of the pixel location respectively. In equation form, the out-of-phase differences may be-defined as follows:

$$op\text{Diff}Y = |y_{F\_in[T]}[n,k] - y_{F\_in[Top]}[n,k]|$$

$$op\text{Diff}Cr = |cr_{F\_in[T]}[n,k] - cr_{F\_in[Top]}[n,k]|$$

$$op\text{Diff}Cb = |cb_{F\_in[T]}[n,k] - cb_{F\_in[Top]}[n,k]|$$

where (i) $y_{F\_in[T]}[n,k]$, $cr_{F\_in[T]}[n,k]$, and $cb_{F\_in[T]}[n,k]$ may be defined as the components, y, cr and cb respectively, of the target pixel (F_n[T][n,k]), and (ii) $y_{F\_in[Top]}[n,k]$, $cr_{F\_in[Top]}[n,k]$ and $cb_{F\_in[Top]}[n,k]$ may be defined as the components, y, cr and cb of the out-of-phase pixel (F_in [Top] [n,k]).

Likewise, the in-phase differences may be defined as follows:

$$ip\text{Diff}Y = |y_{F\_in[T]}[n,k] - y_{F\_in[Tip]}[n,k]|$$

$$ip\text{Diff}Cr = |cr_{F\_in[T]}[n,k] - cr_{F\_in[Tip]}[n,k]|$$

$$ip\text{Diff}Cb = |cb_{F\_in[T]}[n,k] - cb_{F\_in[Tip]}[n,k]|$$

where $y_{F\_in[Tip]}[n,k]$, $cr_{F\_in[Tip]}[n,k]$, and $cb_{F\_in[Tip]}[n,k]$ may be defined as the components, y, cr and cb respectively, of the in-phase pixel (F_in[Tip] [n,k]).

The variables YMatchTh, CrMatchTh, and CbMatchTh are thresholds that determine the maximum in-phase difference, for y, cb and cr respectively, that is allowed before the target and in-phase pixel are no longer considered to "match".

The rejection by the short term shimmer test of oscillations caused by noise may be improved by modifying the second condition (or EQ2) as follows:

$$(ii) \ [(op\text{Diff}Y > ip\text{Diff}Y) \text{ and } (op\text{Diff}Y > Y\text{Noise}Th)] \text{ or}$$

$$[(op\text{Diff}Cr > ip\text{Diff}Cr) \text{ and } (op\text{Diff}Cr > Cr\text{Noise}Th)] \text{ or}$$

$$[(op\text{Diff}Cb > ip\text{Diff}Cb) \text{ and } (op\text{Diff}Cb > Cb\text{Noise}Th)]$$

where YNoiseTh, CrNoiseTh, and CbNoiseTh may be defined as noise thresholds that may determine the minimum out-of-phase difference, for y, cr and cb respectively, that may be considered to have been caused by YC-interference oscillation. If the out-of-phase difference is less than the threshold then the out-of-phase difference may be considered to have been caused by random noise.

For the second tier of the shimmer test, shimmer detector 106 may assign a shimmer value to each pixel location in the input video frame in order to track the results of the short term test over time. The shimmer value for each pixel location may be increased or decreased each input video frame based on the result of the short-term shimmer test for that particular frame. If the short-term shimmer test detects a shimmer pattern, then the shimmer value is increased. Otherwise, the shimmer value is decreased. When the shimmer value exceeds a shimmer threshold (e.g., ShimTh), the location is considered to be shimmering for that particular frame.

The method of accumulating and decaying the shimmer value needs to provide for (i) a reasonably fast detection time, (ii) insensitivity to random noise, and (iii) robustness against false detections caused by motion. A geometric accumulation and decay has been found to provide good results.

Figure 9:
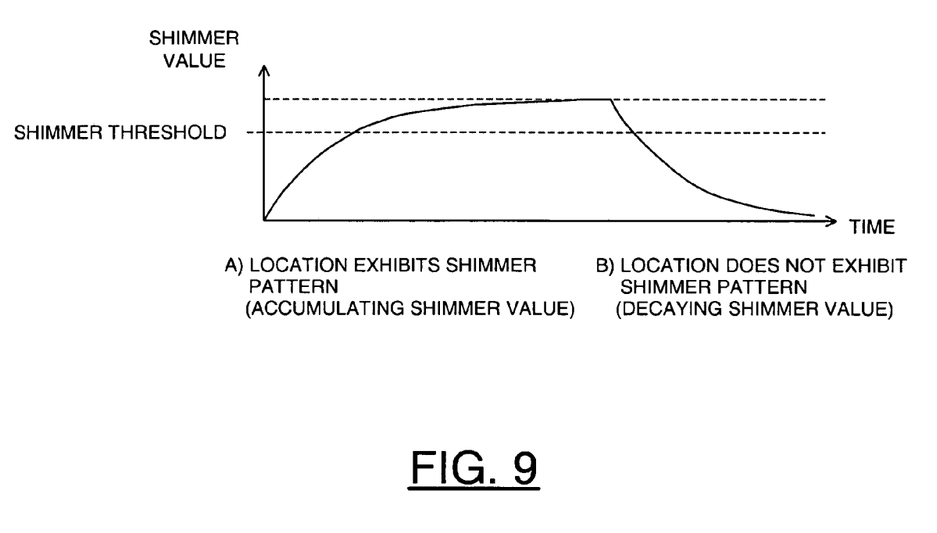
FIG. 9 is a diagram illustrating changes to a shimmer value of a pixel location over time under different conditions.

The shimmer value for pixel location [n,k] is adjusted for the target field T as follows:

if the short-term test detects a shimmer pattern for the location, $$(i) \ \text{shimVal}[n,k][T] = a + d^* \text{shimVal}[n,k][T-2];$$

otherwise, $(ii) \ \text{shimVal}[n,k][T] = d^* \text{shimVal}[n,k][T-2]$ where (i) shimVal[n,k] may be defined as the shimmer value for pixel location [n,k], (ii) shimVal[n,k][T] may be defined as the value of the shimmer value after adjustment for the result of the short-term shimmer test for field T, (iii) shimVal [n,k][T−2] may be defined as the value of the shimmer value after adjustment for field T−2 (the value after the previous frame), (iv) 'd' may be defined as the decay coefficient and may have a value 0<d<1, and (v) 'a' may be defined as the accumulation constant and may have a value a=(Maximum value of shimVal[n,k])*(1−d). FIG. 9 illustrates the changes to a shimmer value over time using the accumulation and decay method outlined above. The shimmer detector 106 may consider a pixel location [n,k] to be shimmering for the target field T if shimVal[n,k][T]>=ShimTh.

Referring to FIG. 9, the shimmer detector circuit 106 may change the signal CTR each pixel period based on the result of the shimmer test for each pixel location. For example, when the component values for pixel location [n,k] for the current input field T are on input 134 of the multiplexer 108 and the corresponding filtered component values (e.g., signal AVG) are on input 132, shimmer detector 106 may set the signal CTR to select an output for 108 based on the shimmer-test result of the location [n,k] for the field T. The shimmer detector 106 selects the signal AVG on input 132 with the signal CTR if the location [n,k] is shimmering for the field T. Otherwise, the shimmer detector 106 selects the unfiltered input signal on input 134.

The present invention generally implements a shimmer detector to identify pixels locations whose components exhibits an oscillation pattern caused by YC-interference noise. The present invention filters only the affected pixels. Since the oscillation pattern only occurs for pixel locations whose ideal values are not changing (e.g., pixels in still areas), the present invention generally avoids motion artifacts.

The present invention may (i) implement the shimmer detector with a motion detector (ii) use the shimmer-test results of adjacent pixel locations to modify the shimmer value of a pixel location and/or (iii) extend the time window used for the short-term shimmer test.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   one or more delay circuits configured to generate a delay of one or more frame periods in response to a format of an input signal;
   a shimmer detector circuit configured to (i) determine which pixel locations in said input signal exhibit an oscillation pattern based on one or more component values of said pixel locations and (ii) generate a control signal in response to one or more outputs of said delay circuits and said input signal;
   an averaging circuit configured to calculate an average signal in response to said input signal and an output of the first delay circuit; and
   a multiplexer configured to present (i) said average signal when said control signal is in a first state and (ii) said input signal when said control signal is in a second state.

2. The apparatus according to claim 1, wherein said shimmer detector circuit is configured to determine which of said pixel locations in said input signal exhibit said oscillation pattern based on said component values of said pixel locations in predetermined frame periods effected by YC-interference noise.

3. The apparatus according to claim 1, wherein said component values oscillate at a fixed value at (i) half the frame rate for National Transmission System Committee transmission standards and (ii) one-quarter the frame rate for phase alternating line (PAL) transmission standards the frame rate due to YC-interference noise.

4. The apparatus according to claim 1, wherein said one or more delay circuits provides a short-term history of said component values for each pixel location.

5. The apparatus according to claim 4, wherein said shimmer detector circuit is configured to (i) examine said short term history of said pixel location and (ii) tentatively identify said pixel locations that are shimmering.

6. The apparatus according to claim 5, wherein said shimmer detector circuit is configured to designate said pixel location as shimmering in response to determining if said pixel location has been tentatively shimmering for a predetermined amount of time.

7. The apparatus according to claim 6, wherein said multiplexer is configured to present said input signal if said pixel location is not determined to be shimmering.

8. The apparatus according to claim 6, wherein said multiplexer is configured to present said average signal if said pixel location is determined to be shimmering.

9. The apparatus according to claim 8, wherein said shimmer detector circuit makes a tentative identification of said pixel locations by (i) comparing a component value of a target pixel to a component value of an in-phase pixel and (ii) determining whether the difference between the component levels of said target pixel and an out-of-phase pixel is greater than the difference of the component levels of said target pixel and said in-phase pixel.

10. The apparatus according to claim 9, wherein said shimmer detector circuit is configured to assign a shimmer value to each pixel location on said input signal to track a shimmer history.

11. The apparatus according to claim 10, wherein said shimmer detector circuit increases or decreases said shimmer value based on whether said pixel location meets a shimmer pattern criteria.

12. The apparatus according to claim 11, wherein said shimmer detector circuit is configured to (i) increase said shimmer value if said shimmer value of said pixel location is greater than an averaging threshold and (ii) decrease said shimmer value of said pixel location is less than said averaging threshold.

13. A method for post-separation comb filtering using shimmer detection, comprising the steps of:
   (A) generating a delay of one or more frame periods in response to a format of an input signal;
   (B) determining which pixel locations is said input signal exhibit an oscillation pattern based on component values of said pixel locations;
   (C) generating a control signal in response to said delays from step (A) and said input signal;
   (D) calculating an average signal in response to said input signal and a first of said delays from step (A); and
   (E) presenting (i) said input signal when said control signal is in a first state and (ii) said average signal when said control signal is in a second state.

14. The method according to claim 13, wherein step (C) further comprises the step of:
   determining which of said pixel locations in said input signal exhibit an oscillation pattern based on said component values which oscillate at half the frame rate for National Television System Committee (NTSC) transmission standards; and
   determining which of said pixel locations in said input signal exhibit an oscillation pattern based on said component values which oscillate at one-quarter the frame rate for phase alternating line (PAL) transmission standards.

15. The method according to claim 13, wherein step (C) further comprises the step of:
   examining a short term history of for each pixel location; and
   tentatively identifying said pixel locations that is shimmering.

16. The method according to claim 15, further comprising the step of:
   designating a pixel location as shimmering in response to determining whether said pixel location has been tentatively shimmering for a predetermined amount of time.

17. The method according to claim 16, further comprising the step of:
   comparing a component value of a target pixel to a component value of an in-phase pixel; and
   determining whether the difference between said component values of said target pixel and an out-of-phase pixel is greater than the difference of the component levels of said target pixel and said in-phase pixel.

18. The method according to claim 17, further comprising the step of:
   assigning a shimmer value to said pixel location on said input signal to track a shimmer history.

19. The method according to claim 18, further comprising the step of:

increasing said shimmer value if said shimmer value of said pixel location is greater than an averaging threshold; and decreasing said shimmer value if said shimmer value of said location of said pixel location is less than said averaging threshold.

20. An apparatus comprising:

means for generating one or more delays for one or more frame periods in response to a format of an input signal;

means for determining which pixel locations in said input signal exhibit an oscillation pattern based on component values of said pixel locations;

means for generating a control signal in response to said input signal and said delays;

means for calculating an average signal in response to said input signal and a first of said delays of one or more frame periods; and means for presenting (i) said input signals when said control signal is in a first state and (ii) said average signal when said control signal is in a second state.

* * * * *